United States Patent
Takaura et al.

(10) Patent No.: US 8,416,471 B2
(45) Date of Patent: Apr. 9, 2013

(54) DOCUMENT ILLUMINATING SYSTEM AND IMAGE READER INCLUDING THE SAME

(75) Inventors: Atsushi Takaura, Machida (JP); Nobuaki Ono, Yokohama (JP); Yasuo Sakurai, Yokohama (JP); Yasunobu Youda, Sagamihara (JP); Kazuya Miyagaki, Yokohama (JP); Masahiro Itoh, Sagamihara (JP)

(73) Assignee: Ricoh Company, Ltd., Tokyo (JP)

( * ) Notice: Subject to any disclaimer, the term of this patent is extended or adjusted under 35 U.S.C. 154(b) by 432 days.

(21) Appl. No.: 12/712,499

(22) Filed: Feb. 25, 2010

(65) Prior Publication Data
US 2010/0214630 A1 Aug. 26, 2010

(30) Foreign Application Priority Data
Feb. 26, 2009 (JP) ................................. 2009-044246

(51) Int. Cl.
*H04N 1/04* (2006.01)

(52) U.S. Cl.
USPC ............ 358/474; 358/471; 358/497; 358/498

(58) Field of Classification Search .................. 358/474, 358/471, 497, 498
See application file for complete search history.

(56) References Cited

U.S. PATENT DOCUMENTS

| | | | |
|---|---|---|---|
| 4,638,987 A | 1/1987 | Sakurai | |
| 4,715,597 A | 12/1987 | Sakurai | |
| 5,124,837 A | 6/1992 | Ono | |
| 5,764,371 A | 6/1998 | Kawashima et al. | |
| 6,067,170 A | 5/2000 | Kawashima et al. | |
| 6,147,781 A | 11/2000 | Tanaka et al. | |
| 6,178,274 B1 | 1/2001 | Youda et al. | |
| 6,349,155 B1 | 2/2002 | Youda et al. | |
| 6,497,488 B1 | 12/2002 | Yamauchi et al. | |
| 7,115,384 B2* | 10/2006 | Clark et al. .................... | 435/29 |
| 7,209,702 B2 | 4/2007 | Kohchi et al. | |
| 7,330,692 B2 | 2/2008 | Kohchi et al. | |
| 7,446,953 B2 | 11/2008 | Itoh et al. | |
| 7,495,682 B2 | 2/2009 | Kohchi et al. | |
| 7,505,714 B2 | 3/2009 | Asanuma et al. | |
| 7,529,032 B2 | 5/2009 | Takaura et al. | |
| 7,537,367 B2 | 5/2009 | Sakurai | |
| 7,538,911 B2 | 5/2009 | Sakurai et al. | |

(Continued)

FOREIGN PATENT DOCUMENTS

| | | |
|---|---|---|
| JP | 2006-042016 A | 2/2006 |
| JP | 2006-295810 A | 10/2006 |

(Continued)

*Primary Examiner* — Houshang Safaipour
(74) *Attorney, Agent, or Firm* — Dickstein Shaprio LLP

(57) ABSTRACT

A document illuminating system includes a plurality of light emitting elements arranged in an array, a reflective element which guides light emitted from the light emitting elements to a document read area of a certain width and length. The reflective element includes first to third reflective portions. The second reflective portion includes one or more planar reflective faces and is disposed so that the reflective faces reflect light from the light emitting elements to one or both of the first and third reflective portions without other reflective elements. The first and third reflective portions each include one or more planar reflective faces and are disposed so that their reflective faces oppositely illuminate the document read area together by reflecting light from one or both of the light emitting elements and the second reflective portion to the document read area without other reflective elements.

8 Claims, 9 Drawing Sheets

U.S. PATENT DOCUMENTS

| | | |
|---|---|---|
| 7,646,536 B2 | 1/2010 | Fujita et al. |
| 2006/0187500 A1 | 8/2006 | Sakurai |
| 2006/0279961 A1 | 12/2006 | Sakurai |
| 2007/0030532 A1 | 2/2007 | Fujioka et al. |
| 2007/0268541 A1 | 11/2007 | Fujita et al. |
| 2008/0068563 A1 | 3/2008 | Abe et al. |
| 2008/0068564 A1 | 3/2008 | Abe et al. |
| 2008/0151356 A1 | 6/2008 | Fujita et al. |
| 2008/0180774 A1* | 7/2008 | Tatsuno ......................... 359/208 |
| 2008/0218724 A1 | 9/2008 | Nishina et al. |
| 2008/0278779 A1 | 11/2008 | Nishina et al. |
| 2009/0066919 A1 | 3/2009 | Fujita et al. |
| 2009/0122364 A1 | 5/2009 | Kohchi et al. |
| 2009/0141370 A1 | 6/2009 | Takaura et al. |
| 2009/0180156 A1 | 7/2009 | Yoshimaru et al. |
| 2009/0195843 A1 | 8/2009 | Satoh et al. |
| 2009/0213440 A1 | 8/2009 | Nishina et al. |
| 2009/0237750 A1 | 9/2009 | Tatsuno et al. |
| 2009/0316224 A1 | 12/2009 | Kawamura et al. |
| 2009/0316225 A1 | 12/2009 | Fujioka et al. |
| 2009/0323139 A1 | 12/2009 | Itoh et al. |

FOREIGN PATENT DOCUMENTS

| | | |
|---|---|---|
| JP | 2008-067276 A | 3/2008 |
| JP | 2008-209879 A | 9/2008 |
| JP | 2009-063613 A | 3/2009 |

* cited by examiner

DOCUMENT ILLUMINATING SYSTEM AND IMAGE READER INCLUDING THE SAME

CROSS REFERENCE TO RELATED APPLICATION

The present application is based on and claims priority from Japanese Patent Application No. 2009-44246, filed on Feb. 26, 2009, the disclosure of which is hereby incorporated by reference in its entirety.

BACKGROUND OF THE INVENTION

1. Field of the Invention

The present invention relates to a document illuminating system for use in an image reader such as a digital copying machine or an image scanner to illuminate an object such as a document as well as to an image reader incorporating such a document illuminating system. It is applicable to a digital copying machine, a facsimile machine, a printer, and a complex machine of these machines.

2. Description of the Related Art

In recent years, LEDs (Light Emitting Diodes) have been well developed and highly bright LEDs are now available. LEDs offer such advantages as high longevity, high efficiency, high resistance to impact, and a mono-color light emission and will be expectedly adapted to various types of illumination including an illumination system of an image reader as a digital copying machine or an image scanner. Further, emission spectrum of a white LED covers a visible range of wavelength bands so that it is adoptable for a document illuminating system of a color image reader.

For this reason, various kinds of document illuminating systems using LEDs have been proposed. There is a well known technique to properly converge light beams with diffusion property from LEDs by a light guide plate or a reflective mirror in order to efficiently illuminate a document read area.

For example, Japanese Laid-open Patent Publication No. 2006-42016 (Reference 1) and No. 2006-295810 (Reference 2) disclose a document illumination system and an image reader to improve illumination performance of an illumination system by use of a reflective mirror. In both of the References, the position of the illumination system is diagonal relative to a document, the illumination system is configured to directly illuminate a document with a light component of a light beam from the LEDs at a small divergent angle to a direction orthogonal to a light emission face and to guide a light component at a large divergent angle to the document by use of a reflective mirror. Reference 1 exemplifies a structure with a reflective mirror including a curved face while Reference 2 exemplifies a structure with a reflective mirror including a planar face.

However, there is a problem in the References 1 and 2 that the diagonal position of the illumination system to the document leads to an increase in thickness and size of the illumination system in an orthogonal direction to the document. In order to decrease the size of the reader, a distance from a light source to the document need to be decreased, which makes it impossible to illuminate the document with an even luminance distribution. Furthermore, this illumination system is configured to illuminate the document from a single direction so that dark lines may occur in an image in reading an uneven document.

In addition, Reference 2 discloses an LED structure having a special covering element to cover an emission face, however, such a covering element faces a problem of high manufacture cost since general low-cost LEDs are not suitable for such a structure.

In order to deal with occurrence of dark lines in an image, Japanese Laid-open Patent Publication No. 2008-67276 (Reference 3) discloses a structure to illuminate an object with light from two illumination elements which oppose to each other (hereinafter, sometimes referred to as opposite illumination). This can prevent dark lines in an image of an uneven document illuminated with light from a single direction.

However, the two opposite illumination elements are each provided with light sources, which also results in increases in the size and manufacture costs of the illuminating system. From the sub-scan direction cross sectional (orthogonal to the document and including sub scan direction) drawing of the Reference 3, it is seen that the circuit board of light emitting elements extends diagonally downwards. Therefore, the document illuminating system of Reference 3 is increased in size in a height direction thereof. Moreover, since a normal line of the light emitting element directs to a direction of the document read area, it is difficult to secure a sufficient optical path length, leading to enlargement and uneven luminance of the illuminating system.

In view of solving the above problems, there is a demand for development of a document illuminating system in small thickness which can oppositely illuminates documents without occurrence of dark lines in an image.

Moreover, along with an increasing demand for a higher-speed, higher image quality image reader, it is required to develop a document illuminating system configured to guide light onto the light-receiving face of the image sensor in even luminance distribution in the sub scan direction for the following reasons.

A read line width of a CCD on a document corresponds to a size of the document in a main scan direction, and a position thereof in the sub scan direction may be shifted from a referential sub scan position due to an error in adjustment of such an optical element as a reflective mirror and an imaging lens or a movement of respective elements in reading a document from one end to the other in the main scan direction. Generally, the shift of a read line width may be about 0.2 to 1.0 mm in the sub scan direction relative to the optical axis of a read system.

Because of this, without illuminating a document with light amounts in even distribution, there will be an area insufficiently illuminated or an area over-illuminated in the document and a defective image (decrease in read accuracy) will occur. In order to prevent uneven illumination, a document area of about several mm in the sub scan direction need be illuminated in proper light amount.

Particularly, a light receiving portion (document read area) of a digital copying machine or an image scanner is very narrow in the sub scan direction, about 0.1 mm, for example. Because of this, the document read area need be illuminated in proper amount such that the center of a luminance distribution curve comes at the document read area; otherwise, luminance of the area is substantially decreased.

There is a demand for a document illuminating system for use in a digital copying machine or an image scanner to illuminate the document read area with even luminance even when the center of illumination shifts from the document read area, so that a wide area of the image sensor in the sub scan direction receives light in proper amount with even luminance distribution.

Preferably, the luminance distribution is to include, near a maximal value, an even portion in a width required to read a document with a fluctuation due to a mechanical error or the like added.

The even portion refers to a portion of the luminance distribution in which a data change rate of electric signals can fall within a practically allowable range by correcting the level of electric signals photo-electrically converted from an image by use of a signal processing circuit provided after the image sensor. For generating monochrome images, an input data change rate of about 30% is allowable by electrically correcting (amplifying) image signal values (gain adjustment). However, for generating color images, the input data change rate has to be about 12% or less since correction of color unbalance of three RGB colors need be taken into consideration rather than the correctable range of gain adjustment.

However, References 1 to 3 cannot achieve even luminance distribution and need to be improved.

SUMMARY OF THE INVENTION

An object of the present invention is to provide a document illuminating system with a small thickness and an even luminance distribution which can oppositely illuminate documents without occurrence of dark lines in images as well as to provide an image reader incorporating such a document illuminating system.

According to one aspect of the present invention, a document illuminating system comprises a plurality of light emitting elements; a reflective element which guides light emitted from the plurality of light emitting elements to a document read area of a certain width and length, wherein the plurality of light emitting elements are arranged in an array so that neighboring light emitting elements at ends of a length direction of the document read area are arranged with a smaller interval than neighboring light emitting elements in a center of the length direction; an emission direction of the plurality of light emitting elements coincides with a width direction of the document read area, the emission direction being a direction of light with a highest intensity among light from the light emitting elements; the reflective element comprises a first reflective portion, a second reflective portion, and a third reflective portion; the second reflective portion includes one or more planar reflective faces and is disposed so that the reflective faces reflect light from the light emitting elements to one or both of the first and third reflective portions without other reflective elements; and the first and third reflective portions each include one or more planar reflective faces and are disposed so that their reflective faces oppositely illuminate the document read area together by reflecting light from one or both of the light emitting elements and the second reflective portion to the document read area without other reflective elements.

According to another aspect of the present invention, an image reader comprises an image sensor; a platen on which a document is placed; the above document illuminating system; and an optical imaging system which images, on the image sensor, reflected light from the document illuminated by the document illuminating system, wherein the optical imaging system comprises a first scanner which includes the document illuminating system and a first reflective mirror reflecting the reflected light, and moves in a predetermined direction for reading an image of the document, a second scanner which includes a second reflective mirror and a third reflective mirror reflecting the reflected light, and moves in a predetermined direction for reading an image of the document, and an imaging lens; and a ratio of a moving speed of the first scanner and that of the second scanner is 2 to 1.

According to another aspect of the present invention, an image reader comprises an image sensor; a platen on which a document is placed; the above document illuminating system; and an optical imaging system which images, on the image sensor, reflected light from the document illuminated by the document illuminating system, wherein the optical imaging system comprises one or more reflective mirrors reflecting the reflected light and an imaging lens; and for reading an image of the document, the image sensor, the document illuminating system, the reflective mirrors, and the imaging lens integrally move in a predetermined direction.

BRIEF DESCRIPTION OF THE DRAWINGS

The present invention will be described below with reference to the following description of exemplary embodiments and the accompanying drawings in which.

DETAILED DESCRIPTION OF THE PREFERRED EMBODIMENTS

First Embodiment

Figure 1:
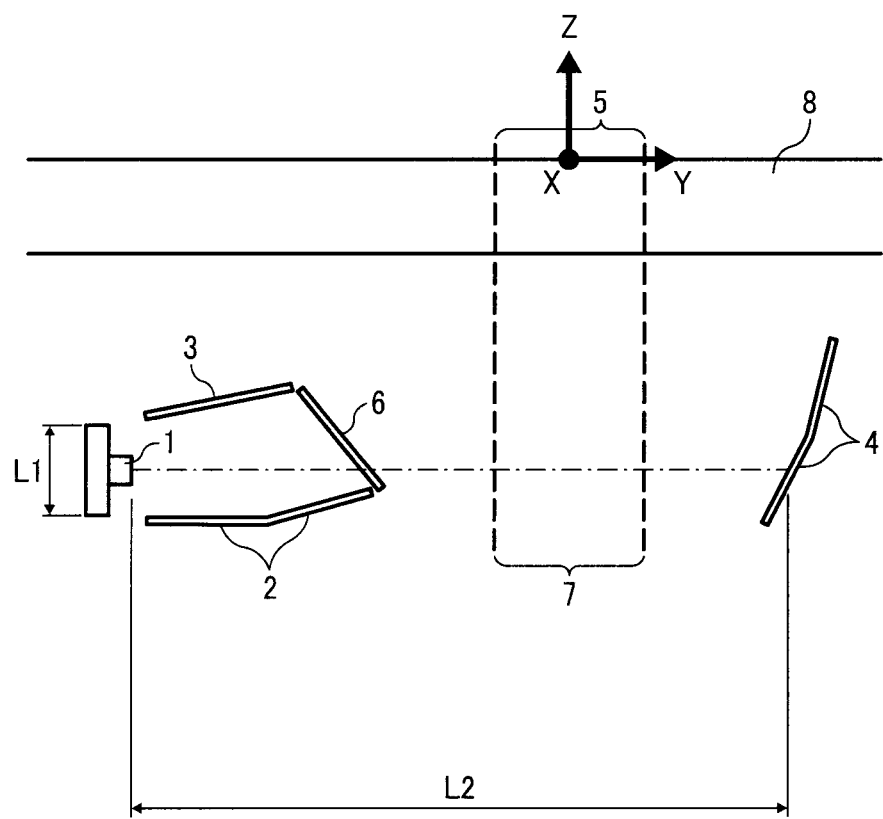
FIG. 1 is a YZ cross sectional view of a document illuminating system according to a first embodiment of the present invention.

Hereinafter, embodiments of the present invention will be described in detail with reference to the accompanying drawings.

A document illuminating system according to a first embodiment of the present invention comprises a plurality of light emitting elements 1, and a reflective element which guides light emitted from the plurality of light emitting elements 1 to a document read area 5 in a certain width and length, wherein the plurality of light emitting elements 1 are arranged in an array so that neighboring light emitting elements 1 at ends of a length direction of the document read area 5 are arranged with a smaller interval than neighboring light emitting elements 1 in the center of the length direction; an emission direction of the plurality of light emitting elements 1 coincides with a width direction of the document read area 5, the emission direction being a direction of light with a highest intensity among light from the light emitting elements; the reflective element comprises a first reflective portion 2, a second reflective portion 3, and a third reflective portion 4; the second reflective portion 3 includes one or more planar reflective faces and is disposed so that the reflective faces are to reflect light from the light emitting elements 1 to one or both of the first and third reflective portions 2, 4 without other reflective elements; and the first and third reflective portions 2, 4 each include one or more planar reflective faces and are disposed so that the reflective faces are to reflect light from one or both of the light emitting elements 1 and the second reflective portion 3 to the document read area 5 without other reflective elements as well as to oppositely illuminate the document read area 5 together.

The document illuminating system according to the first embodiment will be described in detail.

FIG. 1 is a YZ cross sectional view (side view) of a document illuminating system according to the first embodiment of the present invention. In the drawing Y direction is a sub scan direction coinciding with a width direction of the document read area 5, X direction orthogonal to the drawing is a main scan direction coinciding with a length direction of the document read area 5, and Z direction is a direction orthogonal to a document in an XY plane. Throughout all the drawings, the definitions of XYZ directions are the same as above. The document illuminating system of the present invention comprises light emitting elements 1 and a reflective element reflecting light emitted from the light emitting elements 1 to the document read area 5.

The document read area 5 is a virtual area on a platen 8 not as an element of the document illuminating system and receives light from the light emitting elements 1. The document read area 5 has a length equal to or more than a side of a document to be illuminated and a minute width. The minute width is generally about $10^{-2}$ to 1 mm, but can be arbitrarily set in accordance with a structure of an image sensor or an optical imaging system (not elements of the document illuminating system).

According to the first embodiment white LEDs 1 are used for the light emitting elements by way of example. However, the present invention is not limited to such an example. The light emitting elements are preferably white LEDs with which color documents are read in good quality but can be various color LEDs or multi-color LEDs. With use of LEDs as a light source, the document illuminating system consumes less electric power and enjoys a longer operating life than a prior art cold cathode tube or xenon lump. The white LEDs 1 can be known LEDs in an arbitrary shape, for example, circular or rectangular. Circular LEDs are used in the present embodiment. The document illuminating system can be universal and cost effective using the white LEDs 1.

Figure 2:
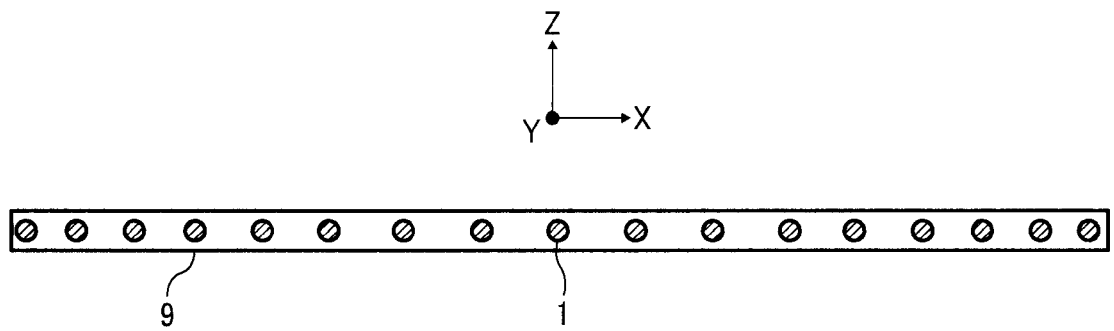
FIG. 2 is an XZ cross sectional view of a plurality of white LEDs 1 according to the first embodiment.

FIG. 2 is an XZ cross sectional view of the plurality of white LEDs 1 according to the first embodiment. In the drawing the white LEDs 1 are arranged in a length direction of the document read area 5 (main scan direction) such that neighboring LEDs 1 at ends of the document read area are arranged with a smaller interval than neighboring LEDs 1 in the center thereof. The LEDs 1 integrally constitute a LED array 8. The white LEDs 1 with a distance from each other shown in FIG. 2 is merely an example and the present invention is not limited to such an example. Alternately, white LEDs 1 at ends of the document read area in the length direction are close to each other while those in the center are separate from each other. The arrangement of the LEDs can be decided arbitrarily in accordance with the size of LEDs as long as ones at ends of the document read area 5 are arranged with a smaller interval than those in the center thereof.

Figure 3:
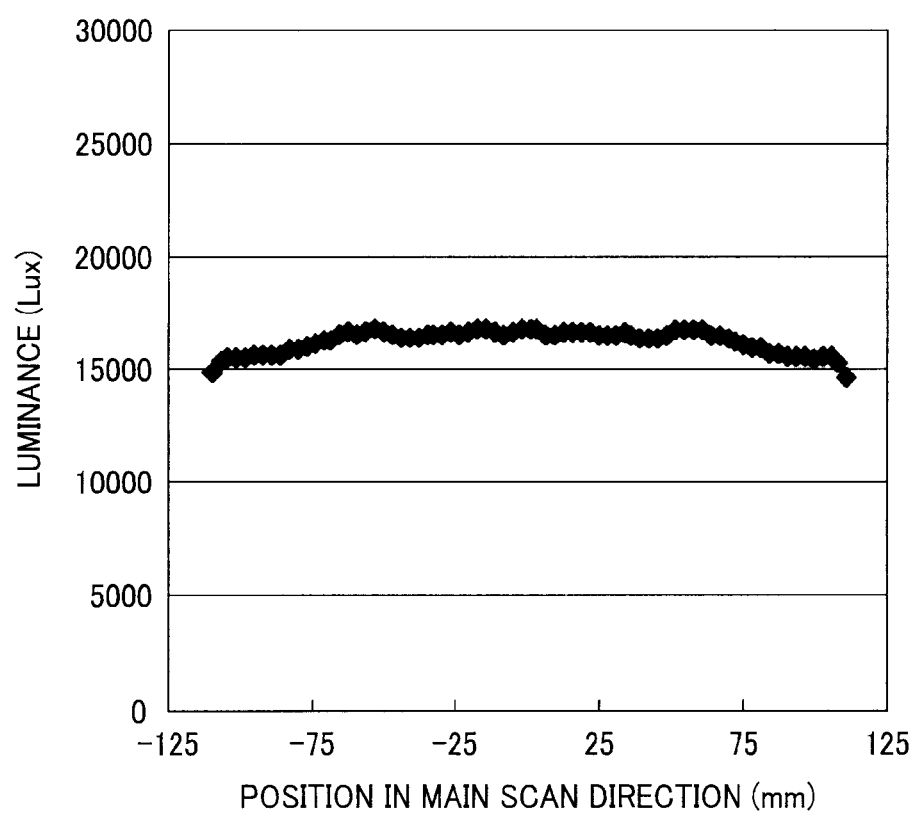
FIG. 3 is a graph showing a luminance distribution of light emitted from the white LEDs 1 of FIG. 2 in the main scan direction after a correction by cosine fourth law.

FIG. 3 is a graph showing a luminance distribution of light emitted from the white LEDs 1 of FIG. 2 in the main scan direction after a correction by cosine fourth law. By unevenly arranging the LEDs 1, luminance distribution can be even in the main scan direction as shown in FIG. 3. According to the present embodiment unevenness in the luminance distribution which is obtained by dividing a difference between a maximum luminance and a minimum luminance by a maximum luminance is about 13%.

Moreover, a normal vector of the light emitting face of the white LEDs 1 coincides with a width direction (Y direction, sub scan direction) of the document read area 5. In the present embodiment the normal vector is an emitting direction of a light beam of with highest intensity among light beams from the white LEDs 1. The light emitting direction of the LEDs 1 does not need to completely coincide with the width direction of the document read area and a small manufactural error or the like is tolerable unless it impairs the effects of the present invention. However, inclination of the light emitting direction to a direction of the document read area 5 is not desirable with users' safety (direct incidence of light onto their eyes) taken into consideration.

The present embodiment can achieve an advantageous effect of preventing occurrence of color shifts on the document read area 5 due to a change in refractive angle of lights with different wavelengths since it does not use a refractive element.

A reflective element according to the present invention reflects light from the white LEDs 1 to the document read area 5, and comprises a first reflective portion 2, a second reflective portion 3, and a third reflective portion 4. In the present embodiment, the first and second reflective portions 2, 3 are disposed to oppose the third reflective portion 4 with the document read area 5 placed in between them in the sub scan direction (Y direction). The first and second reflective portions 2, 3 are on the same side as the white LEDs 1 seen from the sub scan direction of the document read area 5. Further, the white LEDs 1 are placed in between them in a direction orthogonal to a document (Z direction) and the second reflective portion 2 is closer to the document.

Further, in the present invention, the first and third reflective portions 2, 4 are configured to oppositely illuminate the document read area 5. Herein, opposite illumination refers to reflecting (illuminating) light from the LEDs 1 and/or the second reflective portion 3 to the document read area 5 by the first and third reflective portion 2, 4 which oppose each other and place a straight line included in the document read area 5 and matching the Z direction in between them. By the opposite illumination, such a document as having a portion not closely contact with the platen can be properly read without dark lines.

Next, the first to third reflective portions 2 to 4 are described. In the present embodiment the second reflective portion 3 comprises a single planar reflective face and is disposed to reflect a part of light beams from the white LEDs 1 to the first and third reflective portions 2, 4 without other reflective elements. As shown in FIG. 1, the second reflective portion 3 opposes the first and third reflective portions 2, 4 but not the document read area 5. Note that the second reflective portion 3 can be composed of two or more planar reflective faces.

The first reflective portion 2 comprises two or more planar reflective faces and reflects a part of light beams from the white LEDs 1 and at least a part of light beams reflected by the second reflective portion 3 to the document read area 5 without other reflective elements. The first reflective portion 2 can be composed of a single planar reflective face or three or more reflective faces. The structure of the first reflective portion 2 should not be limited to one in the present embodiment and can be determined arbitrarily as long as it can reflect light from the light emitting elements 1 and/or the second reflective portion 3 to the document read area 5 without other reflective elements.

Further, one end of the first reflective portion 2 of the present embodiment is configured to be closer to the document read area 5 than that of the second reflective portion 3 in the sub scan (Y) direction. Accordingly, the first reflective portion 2 can more efficiently reflect light from to the document read area 5.

Moreover, since the first reflective portion 2 comprises two or more planar reflective faces unlike a prior art one having a singular planar reflective face, it can efficiently reflect light to the document read area 5.

It is preferable that the two reflective faces of the first reflective portion 2 are connected with each other without a gap in the connection area (boundary). Without a gap, a later-described film adding process can be done in a lower cost since it is easier to affix a reflective film thereto or a single reflective film can be affixed to two reflective faces of a reflective plate. Also, reflective property of a boundary of the reflective faces is not deteriorated and reflective faces with good optical property can be obtained in low cost.

In the present embodiment the third reflective portion 4 comprises two planar reflective faces and is disposed to reflect a part of light beams from the white LEDs 1 and at least a part of light beams reflected by the second reflective portion 3 to the document read area 5 without other reflective elements.

It is preferable that the two reflective faces of the third reflective portion 4 are connected with each other without a gap in the connection area (boundary). Without a gap, a later-described film adding process can be done in a lower cost since it is easier to affix a reflective film thereto or a single reflective film can be affixed to two reflective faces of a reflective plate. Also, reflective property of a boundary of the reflective faces is not deteriorated and reflective faces with good optical property can be obtained in low cost.

Note that the third reflective portion 4 can be composed of a single planar reflective face or three or more reflective faces. The structure of the third reflective portion 4 should not be limited to one in the present embodiment and can be determined arbitrarily as long as it can reflect light from the light emitting elements 1 and/or the second reflective portion 3 to the document read area 5 without other reflective elements.

Furthermore, according to the present invention it is preferable that the light emitting elements 1, the document read area 5, and the third reflective portion 4 are arranged so as to satisfy the following relation:

$$4 < L2/L1 < 30 \text{ (mm)}$$

where L1 is a length of each light emitting element 1 in a direction orthogonal to the document read area and L2 is a distance from the center of a light emitting face of the light emitting elements 1 (an end of the array in a light emission direction) to the third reflective portion 4, as shown in FIG. 1. More preferably, the relation should be $6.7 < L2/L1 < 12.5$ (mm).

By arranging them as above, a document illuminating system with a small thickness and a high opposite illumination rate can be realized irrespective of the size of LEDs. When L2/L1 is 4 or less, the opposite illumination rate will be decreased while when L2/L1 is 13 or more, the third reflective portion 4 will be increased in size and thickness. According to the present embodiment, L1=2.4 mm, L2=23.3 mm and L2/L1=9.7.

Further, a height of the document illuminating system in a direction orthogonal to a document (a length in Z direction) is set to be as short as 6.4 mm.

Further, in the present embodiment all the first to third reflective portions 2 to 4 can be easily manufactured since they are comprised of planar reflective faces compared to ones composed of curved faces. The reflective faces can be made of deposited metal such as aluminum or a planar member to which a reflective film as a low-price Metalumy (registered trademark) is affixed. It is easy to affix a reflective film to the planar reflective portions without wrinkles in the present embodiment unlike curved reflective portions whose reflective properly is likely to deteriorate.

Figure 4:
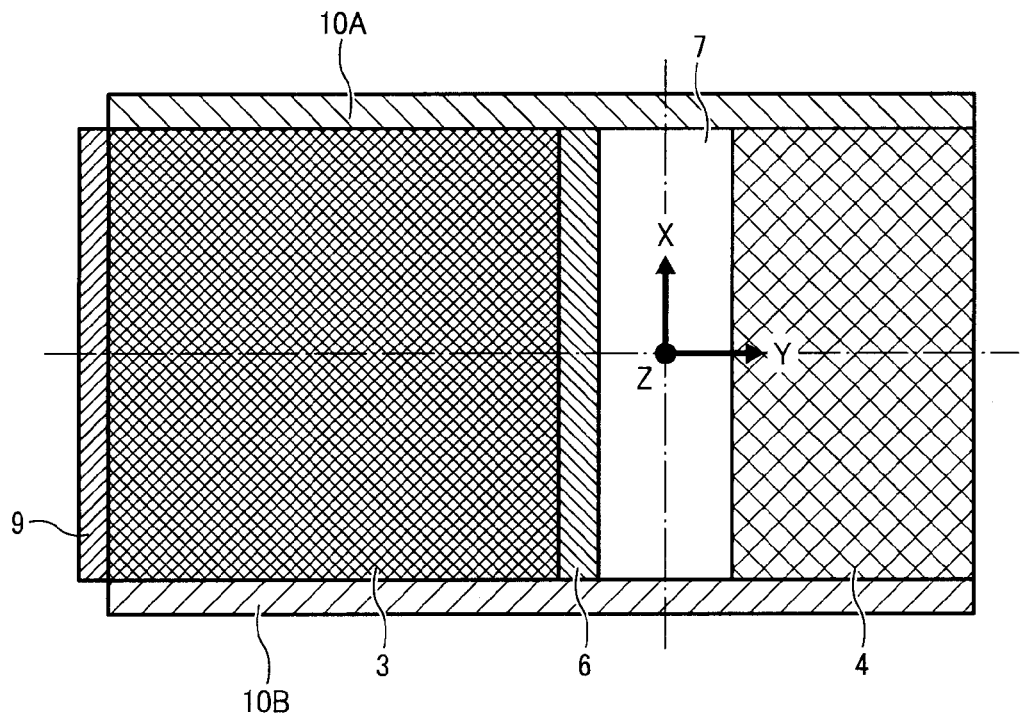
FIG. 4 is a schematic view of the document illuminating system in an XY direction according to the first embodiment of the present invention.

The reflective element according to the present invention preferably comprises a pair of side mirrors at both ends in a length (X) direction. FIG. 4 is an XY cross sectional view of the document illuminating system including side mirrors 10A, 10B according to the first embodiment. For the purpose of preventing a leakage of light from both ends of the document read area 5 in the length direction, the side mirrors 10A, 10B are provided in contact with both ends of the first to third reflective portions 2 to 4 in the length direction of the document read area 5. Also, the other ends of the side mirrors 10A, 10B are in contact with the LED array 9. The side mirrors 10A, 10B include reflective faces which are the same as those of the first to third reflective portions 2 to 4.

Preferably, in the reflective element the first to third reflective portions 2 to 4 are arranged to form an opening 7 through which reflected light from the document read area 5 is emitted in a direction orthogonal to the document read area. The opening 7 is used for a path through which reflected light from the document read area 5 is guided to an image sensor (CCD) provided outside the document illuminating system. Preferably, the opening 7 is a space formed by the first to third reflective portions 2 to 4, however, it can be made of a transparent element with good light transmissive property.

The document illuminating system according to the present invention is provided with an optical diffusion element 6 on an optical path from the LEDs 1 to the document read area 5. Although the optical diffusion element 6 is a sheet-like member in the present embodiment, it can be formed arbitrarily.

The optical diffusion element 6 need be formed in a thickness enough to exert proper strength and optical transmissive property. The present embodiment adopts an optical diffusion sheet with a thickness of 500 μm, for example. With use of the optical diffusion element 6 with a sufficient strength, breakage of the element or deflection of a diffusion face can be prevented. With use of a thin optical diffusion sheet of about 100 µm, it should be secured with a tension, preferably.

Figure 5:
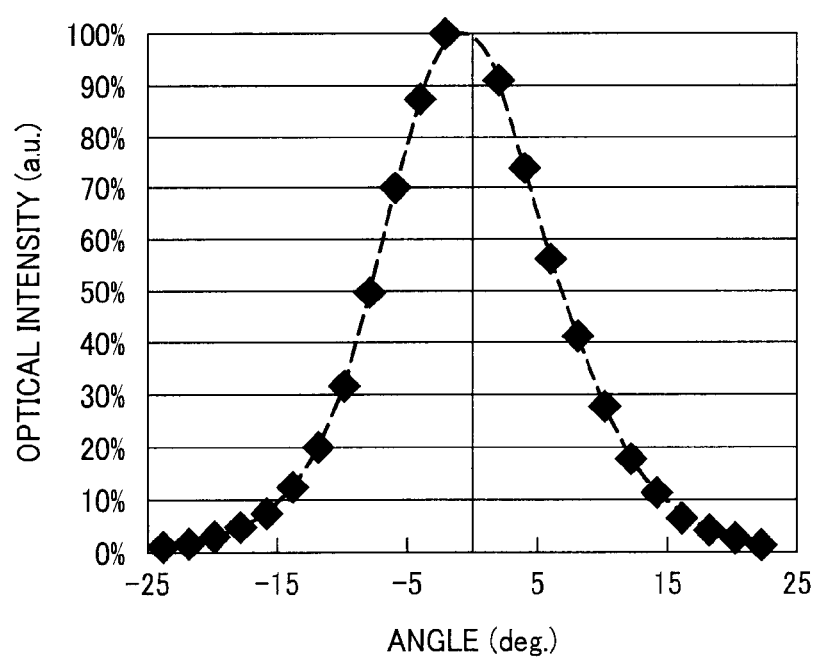
FIG. 5 is a graph showing a scattering property of an optical diffusion element 6 ($\sigma=3.5$) of the document illuminating system according to the first embodiment of the present invention.
Figure 16:
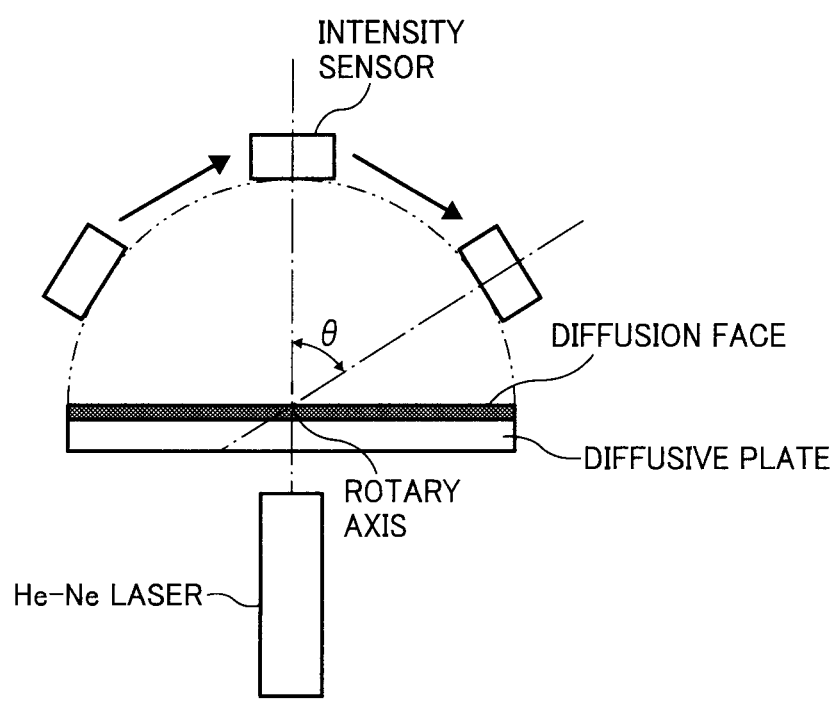
FIG. 16 shows a relation between an angle from a normal line of a diffusive plate and an optical intensity.

The optical diffusion element 6 preferably possesses Gaussian scattering characteristics in a graph with an angle in the abscissa axis when a perpendicular direction of an emitting face is 0 degree and a parallel direction thereof is ±90 degrees. FIG. 5 is a graph showing the scattering characteristics of the optical diffusion element 6 ($\sigma=3.5$) of the document illuminating system. A laser beam was irradiated vertically to a diffusion face of a diffusive plate from a He—Ne (helium neon) laser to measure optical diffusion by the diffusive face, as shown in FIG. 16. A relation between the angle ($\theta$) from the normal line of the diffusive plate and optical intensity was measured while an intensity sensor is rotated around a rotary axis. Having the Gaussian scattering characteristics, it can scatter light in such a manner as to improve evenness in luminance distribution in the sub scan direction compared with one having Lambert scattering characteristics. However, the present invention is not limited to such a diffusion element. An optical diffusion element having Lambert scattering characteristics can be used when it is disposed close to the light emitting elements 1.

For provision of the optical diffusion element 6 in a light emitting opening, Gaussian coefficient $\sigma$ thereof is preferably $2<\sigma<7$. At $\sigma$ being 2 or less, due to an increased directivity, the element cannot exert sufficient diffusion effect and its safety is degraded. At $\sigma$ being 7 or more, due to an increased diffusion property, luminance distribution of light is less even in the sub scan direction. The coefficient $\sigma$ of the diffusion element is 3.5 in the present embodiment.

In the present embodiment the optical diffusion element 6 is disposed very closely, with a minute interval, to the light emitting opening formed at one ends of the first and second reflective portions 2, 3 closer to the document read area in the sub scan direction. Disposing the element closely to the light emitting opening is easier than disposing it inside an area between the first and second reflective portions 2, 3.

Furthermore, the optical diffusion element 6 is preferably disposed so that a diffusion face opposes the document read area 5 in the light emitting direction. This increases use efficiency of light compared to the diffusion face opposing the LEDs 1. The optical diffusion element 6 is a transmissive diffusion sheet with an uneven face which is a diffusion face.

It is preferable that the optical diffusion element 6 is disposed in the opening at an angle $\theta$ being 0 or more and 30 or less with the Z direction when an angle at which the diffusion face opposes the Z direction (parallel to the XZ plane) is 0 degree. The values of the angle $\theta$ go positive counterclockwise in FIG. 1 in the present embodiment. The optical diffusion element 6 is preferably inclined to the LEDs 1 such that the upper end thereof in the Z direction is closer to the LEDs 1 than the bottom end thereof. At the angle $\theta$ being 0 or 30 degrees or more, the evenness of luminance distribution, illumination efficiency, and opposite illumination rate will be deteriorated. Note that the opposite illumination rate (%) refers to a ratio of light amount incident on the document read area 5 via the third reflective portion 4 to the entire light amount incident on the document read area 5.

According to the present embodiment, the more vertical the optical diffusion element 6 relative to a straight line connecting the LEDs 1 and the document read area 5, the higher the evenness of luminance distribution and the opposite illumination rate. Further, in order to prevent a safety risk due to a light leakage from the opening, the optical diffusion element 6 is disposed substantially orthogonal to the straight line from the LEDs 1 to the document read area 5 at the angle $\theta$ of 26 degrees. This is feasible because the first reflective portion 2 is closer to the document read area 5 than the second reflective portion 3 in the sub scan direction.

The optical diffusion element 6 as configured above can exert proper optical diffusion effects without interrupting separation of light at the light emitting opening, and improve evenness of luminance distribution of light. Moreover, it is disposed with a sufficient distance to the white LEDs 1 so that the secondary light emitting face of the optical diffusion element 6 is increased in size, assuring higher safety. Owing to the above optical diffusion effects, amount of light guided from the second to third reflective portions 3, 4 is increased, improving luminance of the opposite illumination. The improvement in the opposite illumination is conspicuous when a distance between the optical diffusion element 6 and the third reflective portion 4 is short.

However, needless to say, the present invention is not limited to such a configuration. For example, the optical diffusion element 6 can be disposed to cover the opening or closely disposed with a minute interval to a light incident opening formed at one ends of the first and second reflective portions 2, 3 closer to the light emitting elements 1 in the sub scan direction, or disposed in contact with the light incident opening. Alternatively, it can be disposed between the two openings for light emission and light incidence. Being in contact with either of the openings without a gap, it is able to completely prevent light leakage, improving safety and light use efficiency of the system.

The optical diffusion element 6 made of a low-price sheet member according to the present embodiment can diffuse light spots of the white LEDs 1. Besides inexpensive LED chips can be used for a light source because there is no specific modification to the light source needed. Small light spots of a light source cannot be directly seen through the optical diffusion element 6 from users and the size of light spots on the optical diffusion element 6 is larger than that of light spots on the light source. Therefore, the optical diffusion element 6 excels in terms of safety.

The document illuminating system according to the present embodiment can separate light beams from the light emitting elements (white LEDs) 1 into the following light beams A to E without a space in the height direction (Z direction).

Light Beam A: Reflected by the first reflective portion 2 to the document read area 5 via the optical diffusion element 6.

Light Beam B: Guided from the light emitting elements 1 to the document read area 5 via the optical diffusion element 6.

Light Beam C: Reflected by the second reflective portion 3 to the first reflective portion 2 and reflected by the first reflective portion 2 to the document read area 5 via the optical diffusion element 6.

Light Beam D: Reflected by the second reflective portion 3 to the third reflective portion 4 via the optical diffusion element 6 and reflected by the third reflective portion 4 to the document read area 5.

Light Beam E: Reaching the third reflective portion 4 via the optical diffusion element 6 and reflected by the third reflective portion 4 to the document read area 5.

Figure 6:
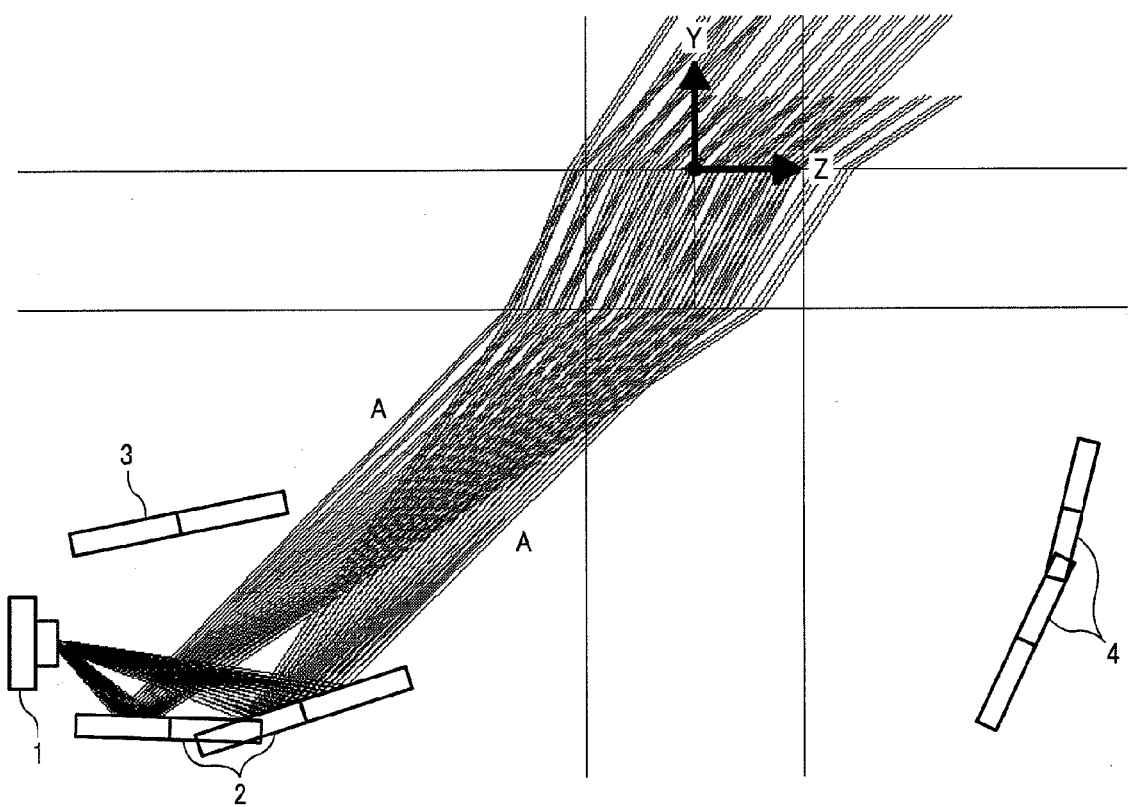
FIG. 6 shows a light beam A of the document illuminating system according to the first embodiment of the present invention.

The above light beams A to E will be described in detail with reference to FIGS. 6 to 8. FIG. 6 shows the light beam A of the document illuminating system. In the drawing a part of the light beams from the white LEDs 1 is reflected by the first reflective portions 2 made of two planar reflective plates to the document read area 5 via the optical diffusion element 6 (not shown).

Figure 7:
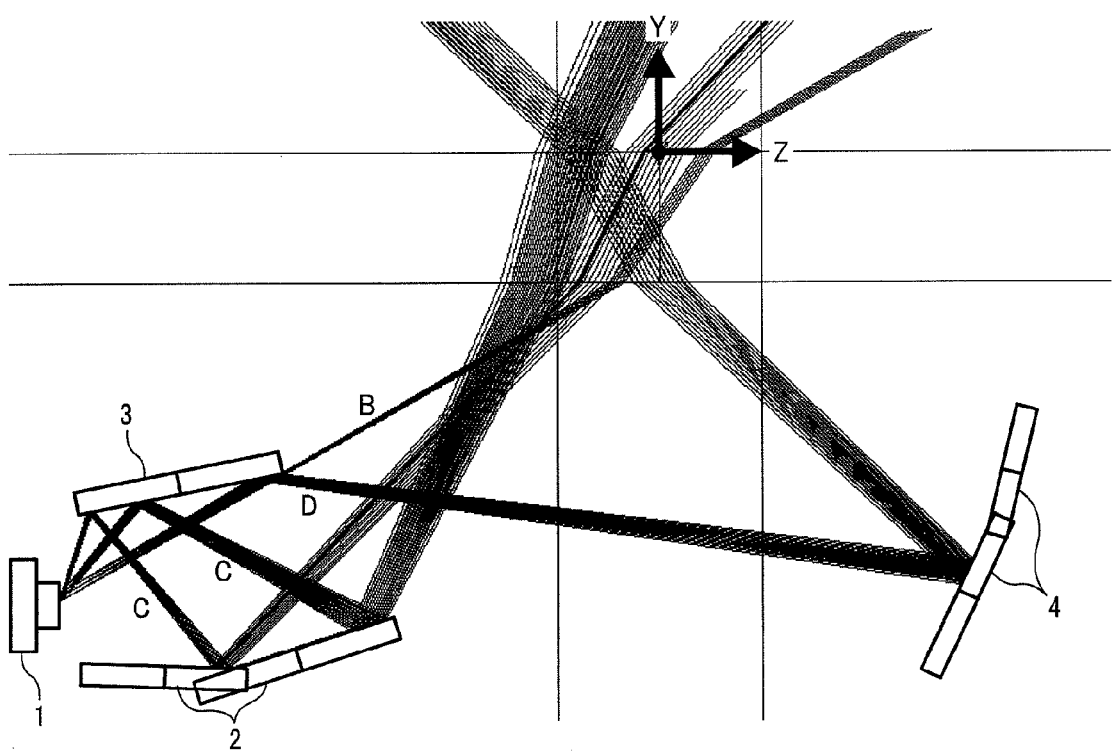
FIG. 7 shows light beams B to D of the document illuminating system according to the first embodiment of the present invention.

FIG. 7 shows the light beams B to D of the document illuminating system. In the drawing a part of the light beams from the white LEDs 1 is reflected by the second reflective portions 3 made of a single planar reflective plate to the first and third reflective portions 2, 4 and reflected by them separately to the document read area 5. The light beam reflected by the first reflective portion 2 passes through the optical diffusion element 6 (not shown) interposed between the first reflective portion 2 and the document read area 5 while the light beam reflected by the second reflective portion 3 passes through the optical diffusion element 6 (not shown) interposed between the second and third reflective portions 2, 3. As shown in FIG. 7, a part of the light beams from the white LEDs 1 reach the document read area 5 via the optical diffusion element 6 (not shown).

Figure 8:
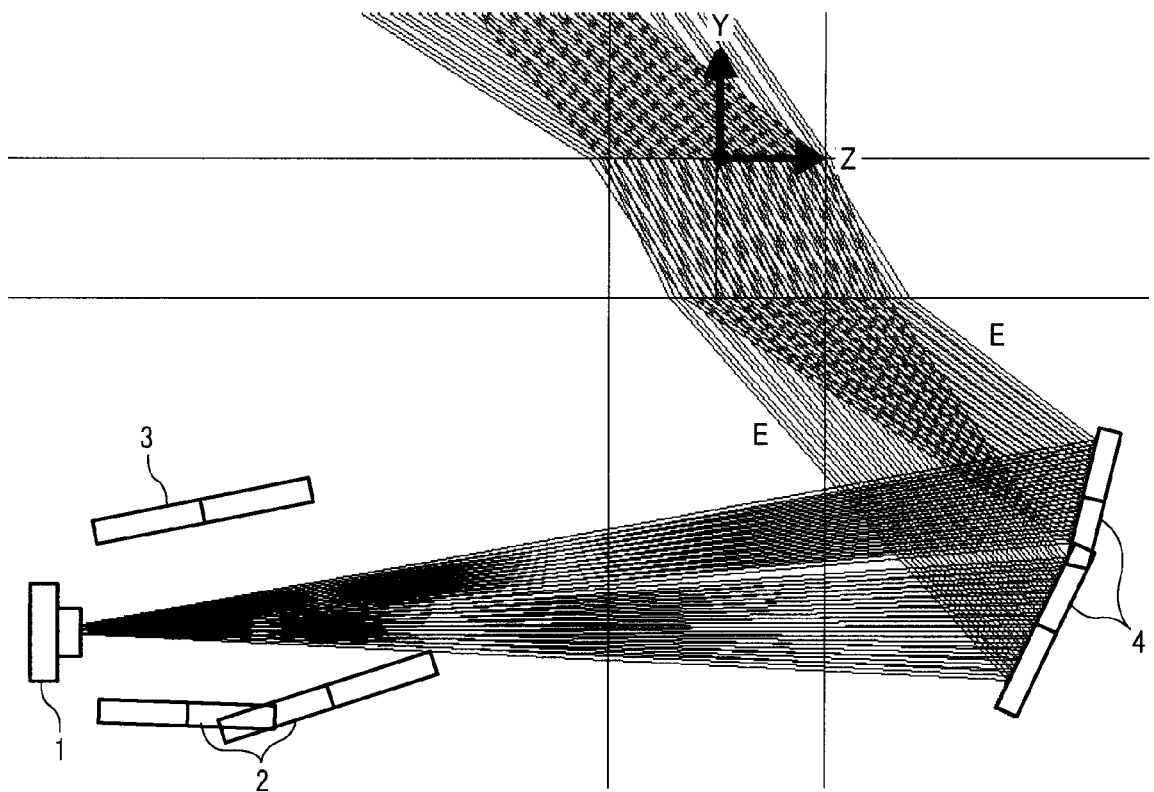
FIG. 8 shows a light beam E of the document illuminating system according to the first embodiment of the present invention.

FIG. 8 shows the light beam E of the document illuminating system. In the drawing a part of the light beams from the white LEDs 1 is reflected by the third reflective portions 4 made of two planar reflective plates to the document read area 5 via the not-shown optical diffusion element 6.

Figure 9:
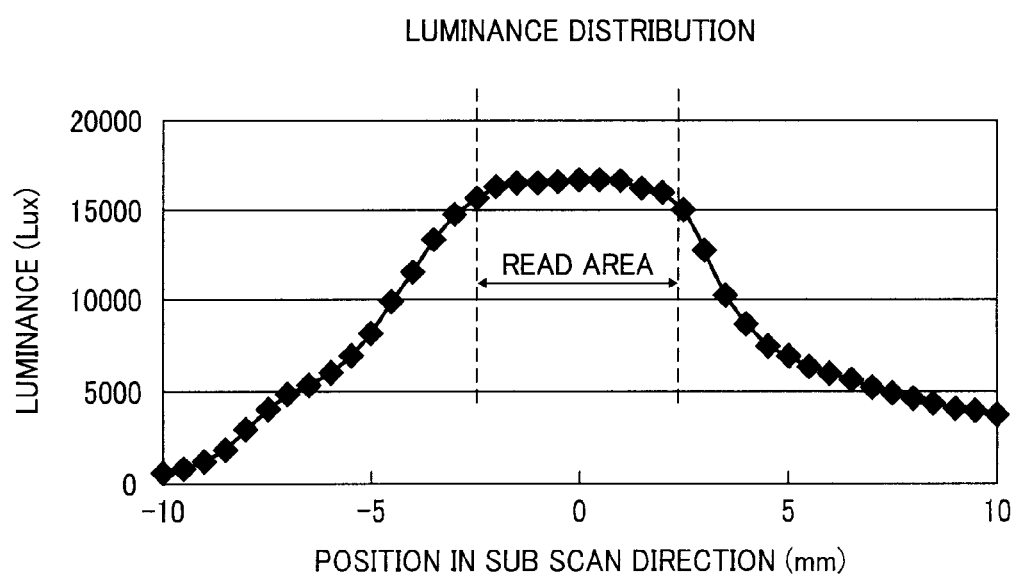
FIG. 9 is a graph showing a luminance distribution of the document illuminating system in the sub scan direction according to the first embodiment.

The light beams A to E illuminate the document read area 5 together and achieve wide, even luminance distribution in the sub scan direction as shown in FIG. 9. From the luminance distribution in FIG. 9, luminance distribution on the image sensor in the sub scan direction at $\sigma=3.5$ is evaluated. Evenness of the luminance distribution of an area of the light receiving face of the image sensor equivalent to the document read area 5 in a 5 mm width in the sub scan direction is calculated by (maximum luminance−minimum luminance)/ (maximum luminance) and the result is 11.5%. Similarly, when the width of the document read area 5 in the sub scan direction is 4 mm, evenness of luminance distribution on the image sensor is only a little less than 6%. Also, the light use efficiency is a little more than 21% in the present embodiment. The light use efficiency refers to a rate of light amount (Lm) reaching the document read area 5 relative to light amount (Lm) from the light emitting elements 1. Luminance of the light beams D, E reaching the document read area 5 via the third reflective portion 4 (opposite illumination rate) accounts for 35% or more of the total luminance, which indicates that the opposite illumination provides sufficient illumination amount.

Note that reflected light from the document read area 5 reaches the image sensor (CCD) through the opening 7 and the optical imaging system (later described in detail). It is well known that peripheral luminance of reflected light reaching the image sensor is decreased by cosine fourth law according to angle of view of the optical imaging system. Therefore, the luminance distribution is corrected before the evaluation with a decrease by the cosine fourth law taken into consideration. The corrected luminance distribution is to be preferably even. Without the cosine fourth law correction, preferably, luminance of a peripheral area of the read position is higher than that of the center of the read position in the sub scan direction.

Furthermore, the light emitting face of the light emitting element 1 is very small in horizontal and vertical size as about 200 μm, for example, and is almost like a point light source. However, via the optical diffusion element 6, the light beam B is enlarged to a little less than 2 mm in diameter (or total width when optical power is decreased to 1/e of the peak). For example, with use of a sheet type optical diffusion element 6 having Gaussian coefficient=6, the light beam will be about 1.6 mm in spot diameter. Such enlargement of light spots results in assuring users' safety when they directly see light spots on the optical diffusion element 6. Also, the document illuminating system is configured not to allow users to directly see the light emitting face of the white LEDs 1.

According to the document illuminating system of the present invention, combinations of the reflective faces guiding light beams from the light emitting elements 1 to the document read area 5 should be preferably 7 or more. As shown in FIGS. 6 to 8, there are seven combinations in total, two combinations of the light beam A, two combinations of the light beam C, one combination of the light beam D and two combinations of the light beam E in the present embodiment. Accordingly, the document read area can be illuminated with a large number of light beams with different luminance distributions, improving evenness of the luminance distribution.

Further, the light beams illuminate not the center but the periphery (ends) of the document read area in the sub scan direction (Y direction) at highest luminance. The light emitting elements 1 have such property that they emit light at highest intensity from a normal line direction of the light emitting face and the larger the angle of emitted light relative to the normal line, the weaker the intensity of the emitted light. Therefore, it is possible to find positions of the document read area 5 where the light beams A to E reach, from the light beams making the smallest and largest angles with the normal line. In such a manner, it is able to find that the periphery (ends) of the document read area in the sub scan direction is illuminated at highest luminance.

Preferably, the document illuminating system is configured to illuminate, at highest luminance, the periphery of the document read area in the sub scan direction with at least one of the light beams from the LEDs, more preferably, with all of the light beams. Owing to the effects of the cosine fourth law, reflected light from the document read area 5 through the optical imaging system illuminates a periphery of the light receiving face of the image sensor at lower luminance. Because of this, luminance distribution on a corresponding position of the light receiving face in the sub scan (width) direction will be even and a wider area thereof can be illuminated in even luminance distribution.

Second Embodiment

Figure 10:
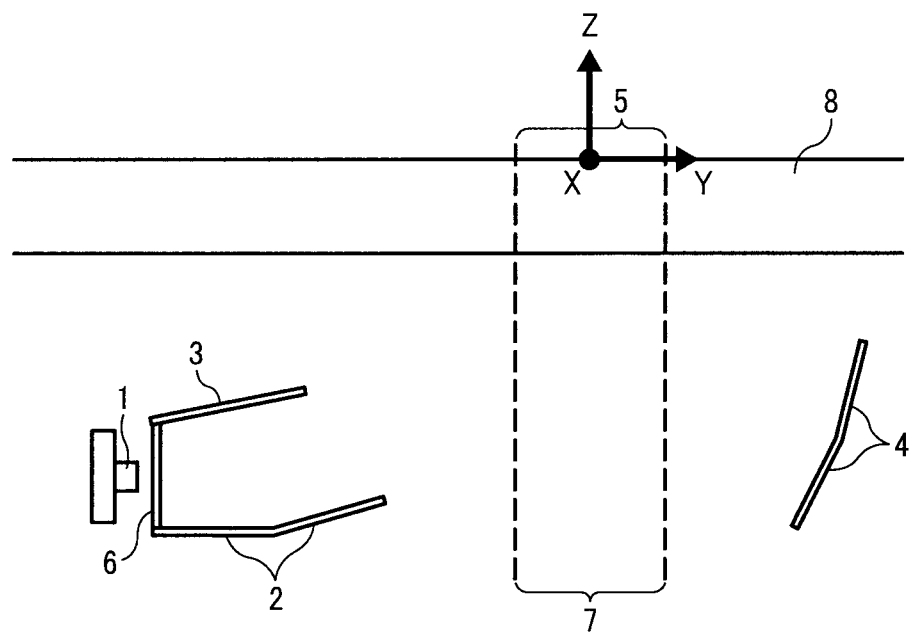
FIG. 10 is a YZ cross sectional view of a document illuminating system according to a second embodiment of the present invention.

FIG. 10 is a YZ cross sectional view of a document illuminating system according to a second embodiment of the present invention. The second embodiment is different from the first embodiment in Gaussian coefficient σ of the optical diffusion element 6, in that the sheet type optical diffusion element 6 is closely disposed with a minute interval to a light incident opening formed at ends of the first and second reflective portions 2, 3 in the sub scan direction, and that the optical diffusion element 6 is parallel to the light emitting face of the white LEDs 1 or the XZ direction (i.e., parallel to an orthogonal direction to the document read area and orthogonal to the emission direction of the white LEDs 1). The rest of the second embodiment is the same as that of the first embodiment so that a description thereof will be omitted.

Since the optical diffusion element 6 is disposed adjacent to the light incident opening (near the white LEDs 1), a required size thereof is decreased to about ¼ to ⅓ of the one in the first embodiment, decreasing manufacturing costs. Also, the optical diffusion element 6 can be easily mounted and is excellent in terms of safety.

Further, the optical diffusion element 6 is disposed closely to the light incident opening and parallel to the light emitting face of the white LEDs 1 so that intensity of illumination is reduced on the center of the document read area in the sub scan direction, improving evenness of luminance distribution on the image sensor in the sub scan direction.

Light beams diffused by the optical diffusion element 6 is quickly incident on an area surrounded by the first and second reflective portions 2, 3 and the side mirrors 10A, 10B. Because of this, light leakage can be prevented to achieve high light use efficiency.

The Gaussian coefficient σ of the optical diffusion element 6 provided in the light incident opening is preferably to be 10<σ<15. With such a range of the Gaussian coefficients, it can exert proper diffusion property and be a safe and secure element. In the present embodiment the Gaussian coefficient σ of the optical diffusion element 6 is 13.

Figure 11:
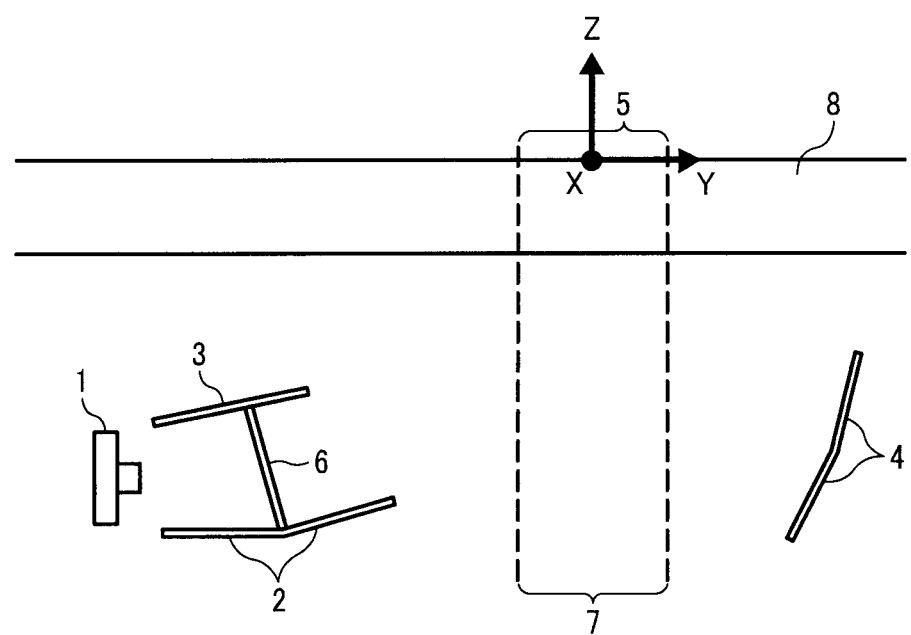
FIG. 11 is a YZ cross sectional view of a modified example of the document illuminating system according to the first embodiment of the present invention.

FIG. 11 is a YZ cross sectional view of a document illuminating system as a modification to the one in the first embodiment. A difference between this system and the one in the first embodiment is in that the optical diffusion element 6 is provided between the light emitting opening and the light incident opening in contact with the first and second reflective portions 2, 3. The rest of the structure is the same as that of the one in the first embodiment.

Third Embodiment

The Gaussian coefficient σ of the optical diffusion element 6 according to the present embodiment is 6.5. The rest of the structure of the system is the same as that of the one in the first embodiment. With the coefficient σ being 6.5, evenness of the luminance distribution of an area of the light receiving face of the image sensor equivalent to the document read area 5 in a 5 mm width in the sub scan direction is 15.5%. When the width of the document read area 5 is 4 mm, it is decreased to 8.3%.

With the coefficient of σ being 7, the evenness of luminance distribution of the same (document read area 5 in a 5 mm width) is 18.5%. When the width of the document read area 5 is 4 mm, it is decreased to 12.5%.

Fourth Embodiment

Figure 12:
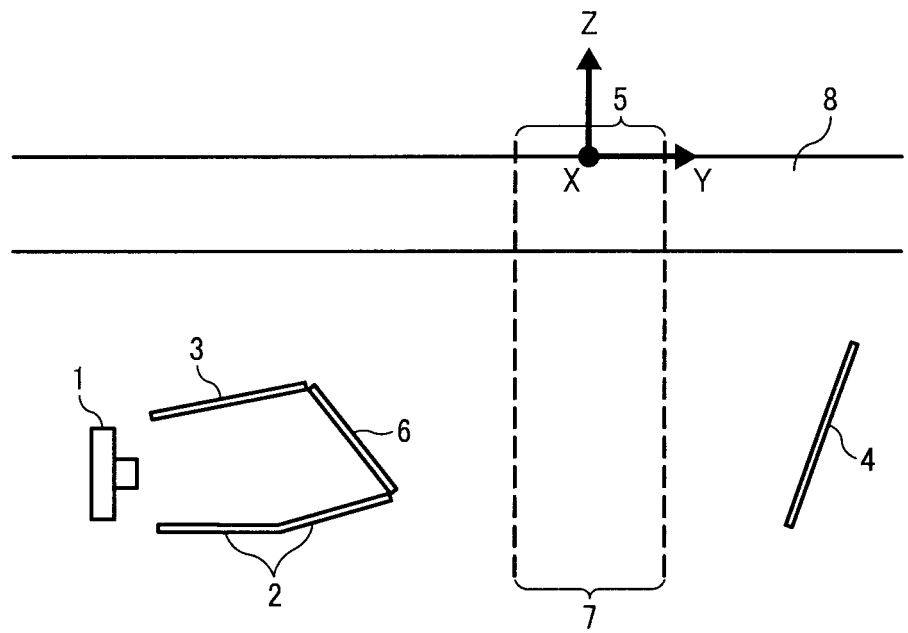
FIG. 12 is a YZ cross sectional view of a document illuminating system according to a fourth embodiment of the present invention.

FIG. 12 is a YZ cross sectional view of a document illuminating system according to a fourth embodiment of the present invention. A difference between this system and the one in the first embodiment is in that the third reflective portion 4 is made of a single planar reflective face. The rest of the structure is the same as that of the one in the first embodiment. The third reflective portion 4 having a single reflective face can be more easily manufactured.

Fifth Embodiment

Figure 13:
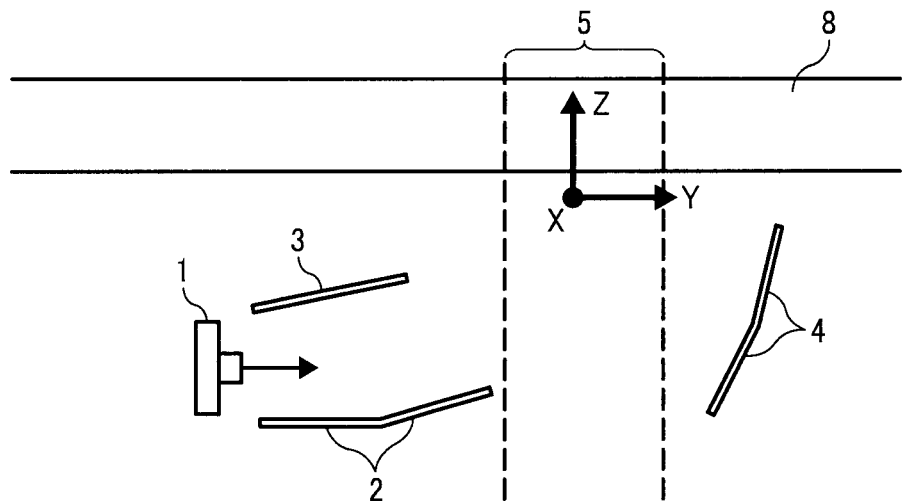
FIG. 13 is a YZ cross sectional view of a document illuminating system according to a fifth embodiment of the present invention.

FIG. 13 is a YZ cross sectional view of a document illuminating system according to a fifth embodiment of the present invention. A difference between this system and the one in the first embodiment is in that it does not comprise the sheet-type optical diffusion element 6. The rest of the structure is the same as that of the one in the first embodiment.

According to the present embodiment, evenness of the luminance distribution of an area of the light receiving face of the image sensor equivalent to the document read area 5 in a 5 mm width in the sub scan direction is 8.5%. When the width of the document read area 5 is 4 mm, it is only 7%. Similarly to the one in the first embodiment, a document illuminating system with small thickness and high opposite illumination rate can be realized and reduce occurrence of dark lines.

Six Embodiment

Figure 14:
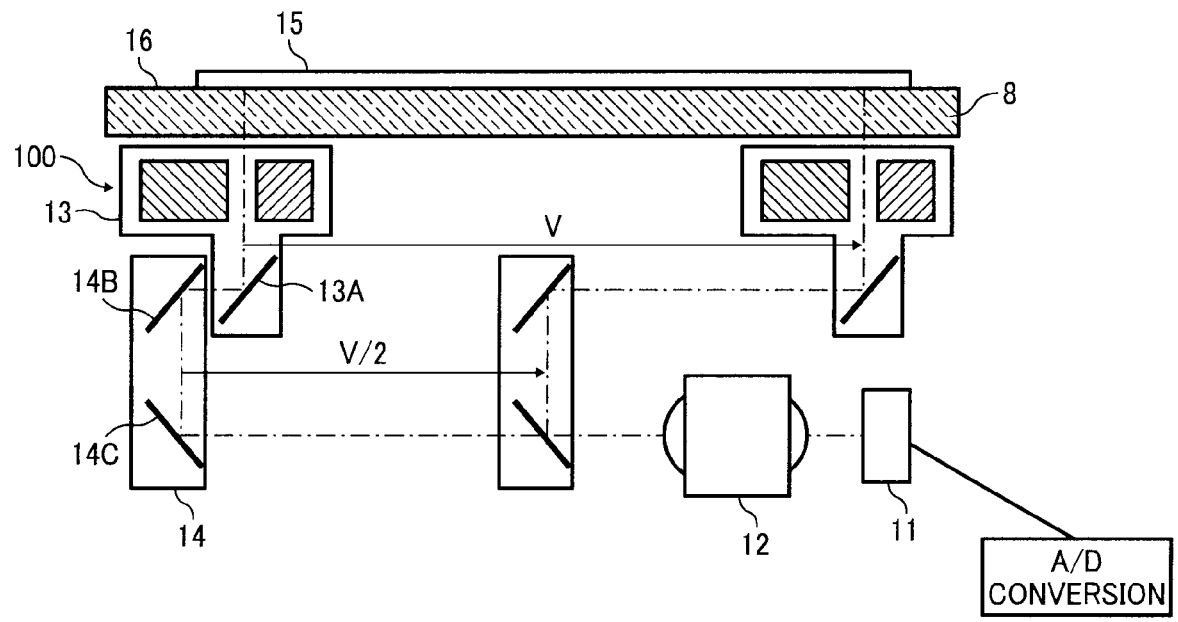
FIG. 14 is a YZ cross sectional view of an image reader according to a sixth embodiment of the present invention.

FIG. 14 is a YZ cross sectional view of an image reader according to a six embodiment of the present invention. The image reader comprises any one of the document illuminating systems according to the first to fifth embodiment and exploits its advantageous features.

The image reader according to the present embodiment comprises an image sensor 11, a platen 8 on which a document 15 is placed, a document illuminating system 100, and an optical imaging system which forms, on the image sensor 11, an image of a reflected light from the document 15 illuminated with the document illuminating system 100. Note that any known image sensor such as CCD can be used for the image sensor 11. The image sensor 11 photoelectrically converts optical signals of document data into electric signals to read one side 16 of the document 15.

The optical imaging system comprises a first reflective mirror 13A, a second reflective mirror 14B, a third reflective mirror 14C, a first scanner 13, a second scanner, 14, and an imaging lens 12. The first scanner 13 includes the document illuminating system 100 and the first reflective mirror 13A and moves from left to right in FIG. 14. The second scanner 14 includes the second reflective mirror 14B and the third reflective mirror 14C and moves from left to right in FIG. 14. A ratio of the moving speed V1 of the first scanner 13 and that V2 of the second scanner 14 is 2 to 1.

As shown in FIG. 14, an optical path length y from the document read area to the image sensor 11 varies by y when a moving distance of the first scanner 13 is y in the Y direction. Meanwhile, an optical path length y from the document read area to the image sensor 11 varies by 2y when a moving distance of the second scanner 14 is y in the Y direction. At the speed ratio V1 to V2 being 2 to 1, it is possible to scan a document with a constant optical path length or conjugation length of the optical imaging system.

The image reader according to the present embodiment can be made in a compact size and a small thickness due to a small thickness of the document illuminating system 100. Further, the document illuminating system 100 advantageously achieves even luminance distribution in the sub scan direction and realizes stable optical signals on the image sensor 11, tolerating a dynamic shift along with scanning or an error in positions of optical elements such as the respective reflective faces, reflective mirrors, and the imaging lens 12. Also, it can contribute to reducing a tolerance of such optical elements. Accordingly, it is possible to reduce fluctuations in the optical signals on the image sensor 11 due to static and dynamic positional shifts of elements of the image reader.

Seventh Embodiment

Figure 15:
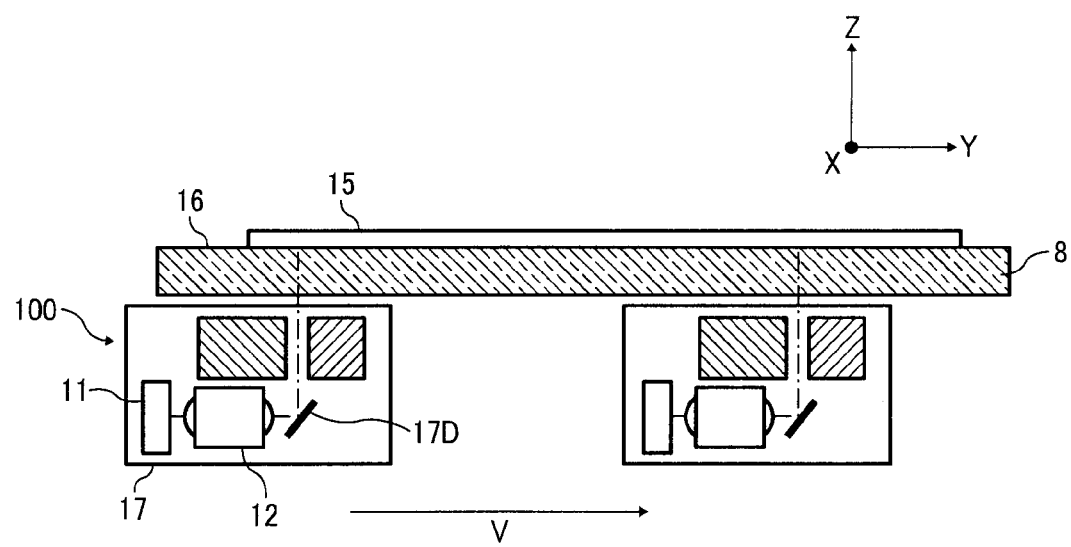
FIG. 15 is a YZ cross sectional view of an image reader according to a seventh embodiment of the present invention.

FIG. 15 is a YZ cross sectional view of an image reader according to a seventh embodiment of the present invention. Similarly to the one in the sixth embodiment, the image reader comprises any one of the document illuminating systems according to the first to fifth embodiment and exploits its advantageous features.

As the one in the sixth embodiment, the image reader comprises an image sensor 11, a platen 8 on which a document 15 is placed, a document illuminating system 100, and an optical imaging system which forms, on the image sensor 11, an image of a reflected light from the document 15 illuminated with the document illuminating system 100.

The optical imaging system comprises a reflective mirror 17D and an imaging lens 12. The image sensor 11, the document illuminating system 100, the reflective mirror 17D, and the imaging lens 12 integrally constitute a scanner and move in the Y direction (sub scan direction) in FIG. 15 to scan data of the document 15. According to the image reader in the present embodiment, without necessity to drive the reflective mirror 17D, the structure of a driving system can be simplified, resulting in reducing the size and weight of the entire image reader. Moreover, even with a vibration caused by moving of the scanner, a change in relative positions of the document illuminating system 100, the reflective mirror 17D, the imaging lens 12 and the image sensor 11 can be reduced more than that of the same in the sixth embodiment. This can reduce fluctuations in the optical signals on the image sensor 11.

Although the present invention has been described in terms of exemplary embodiments, it is not limited thereto. It should be appreciated that variations may be made in the embodiments described by persons skilled in the art without departing from the scope of the present invention as defined by the following claims.

What is claimed is:

1. A document illuminating system comprising:
a plurality of light emitting elements;
a reflective element which guides light emitted from the plurality of light emitting elements to a document read area of a certain width and length, wherein:
an emission direction of the plurality of light emitting elements coincides with a width direction of the document read area, the emission direction being a direction of light with a highest intensity among light from the light emitting elements;
the reflective element comprises a first reflective portion, a second reflective portion, and a third reflective portion;
the first reflective portion includes two or more continuous planar reflective faces, and is disposed so that one end of the first reflective portion is closer to the document read area than that of the second reflective portion in a sub scan direction;
the second reflective portion includes one or more planar reflective faces and is disposed so that the reflective faces reflect light from the light emitting elements to one or both of the first and third reflective portions without other reflective elements; and
the first and third reflective portions each include one or more planar reflective faces and are disposed so that their reflective faces oppositely illuminate the document read area together by reflecting light from one or both of the light emitting elements and the second reflective portion to the document read area without other reflective elements.

2. A document illuminating system according to claim 1, wherein the reflective element comprises a pair of side mirrors at both ends in the length direction.

3. A document illuminating system according to claim 1, wherein
in the reflective element the first to third reflective portions are arranged to form an opening through which reflected light from the document read area is emitted in a direction orthogonal to the document read area.

4. A document illuminating system according to claim 1, wherein:
the first and third reflective portions each comprise two or more planar reflective faces; and
combinations of the reflective faces to guide light from the light emitting elements to the document read area are 7 or more.

5. A document illuminating system according to claim 4, wherein
light guided through at least one of the combinations of the reflective faces illuminates an end of the document read area in the width direction at a highest luminance.

6. A document illuminating system according to claim 1, wherein
the light emitting elements, the document read area, and the third reflective portion are arranged so as to satisfy the following relation:

$$4 < L2/L1 < 30$$

where L1 is a length of each of the light emitting elements in a direction orthogonal to the document read area and L2 is a distance from an end of the array of the light emitting elements in the emission direction to the third reflective portion.

7. An image reader comprising:
an image sensor; a platen on which a document is placed; a document illuminating system according to claim 1; and
an optical imaging system which images, on the image sensor, reflected light from the document illuminated by the document illuminating system, wherein:
the optical imaging system comprises
a first scanner which includes the document illuminating system and a first reflective mirror reflecting the reflected light, and moves in a predetermined direction for reading an image of the document,
a second scanner which includes a second reflective mirror and a third reflective mirror reflecting the reflected light, and moves in a predetermined direction for reading an image of the document, and
an imaging lens; and
a ratio of a moving speed of the first scanner and that of the second scanner is 2 to 1.

8. An image reader comprising:
an image sensor; a platen on which a document is placed; a document illuminating system according to claim 1; and
an optical imaging system which images, on the image sensor, reflected light from the document illuminated by the document illuminating system, wherein:
the optical imaging system comprises one or more reflective mirrors reflecting the reflected light and an imaging lens; and
for reading an image of the document, the image sensor, the document illuminating system, the reflective mirrors, and the imaging lens integrally move in a predetermined direction.

* * * * *